(12) United States Patent
Amirkhany

(10) Patent No.: US 9,923,664 B2
(45) Date of Patent: Mar. 20, 2018

(54) COMMON-MODE SIGNALING FOR TRANSITION ENCODING

(71) Applicant: Samsung Display Co., Ltd., Yongin-si, Gyeonggi-do (KR)

(72) Inventor: Amir Amirkhany, Sunnyvale, CA (US)

(73) Assignee: Samsung Display Co., Ltd., Yongin-si (KR)

(*) Notice: Subject to any disclaimer, the term of this patent is extended or adjusted under 35 U.S.C. 154(b) by 61 days.

(21) Appl. No.: 14/866,798

(22) Filed: Sep. 25, 2015

(65) Prior Publication Data
US 2016/0099726 A1 Apr. 7, 2016

Related U.S. Application Data

(60) Provisional application No. 62/058,621, filed on Oct. 1, 2014.

(51) Int. Cl.
*H04L 1/00* (2006.01)

(52) U.S. Cl.
CPC .......... *H04L 1/0009* (2013.01); *H04L 1/0041* (2013.01); *H04L 1/0042* (2013.01)

(58) Field of Classification Search
None
See application file for complete search history.

(56) References Cited

U.S. PATENT DOCUMENTS

| | | | | |
|---|---|---|---|---|
| 4,291,406 A | * | 9/1981 | Bahl | H04L 1/0054 714/787 |
| 5,371,751 A | * | 12/1994 | Moriyama | H03M 13/1515 714/758 |
| 5,657,331 A | * | 8/1997 | Metzner | H03M 13/17 714/761 |
| 6,662,332 B1 | * | 12/2003 | Kimmitt | H03M 13/276 714/701 |
| 7,295,578 B1 | * | 11/2007 | Lyle | G06F 3/14 348/473 |
| 7,720,666 B1 | * | 5/2010 | Niver | H04L 43/0823 703/17 |
| 7,984,367 B1 | * | 7/2011 | Chaichanavong | H03M 13/1111 714/788 |
| 2003/0028731 A1 | * | 2/2003 | Spiers | H04L 49/90 711/147 |

(Continued)

FOREIGN PATENT DOCUMENTS

| | | |
|---|---|---|
| JP | 05-022357 | 1/1993 |
| JP | 2008-245128 | 10/2008 |

*Primary Examiner* — Steve Nguyen
(74) *Attorney, Agent, or Firm* — Lewis Roca Rothgerber Christie LLP

(57) ABSTRACT

A method for transmitting an input stream of data across a serial link including a serial channel. The method includes segmenting the stream of data into blocks of bits to form input blocks, and for each input block, calculating a measure of burst error probability, forming an output block and a modification signaling bit from the input block, transmitting the output block, and transmitting the modification signaling bit. The forming of the output block and the modification signaling bit from the input block includes, when the measure of burst error probability exceeds a set threshold: modifying the input block to form the output block, and asserting the modification signaling bit.

19 Claims, 8 Drawing Sheets

(56) References Cited

U.S. PATENT DOCUMENTS

| | | | |
|---|---|---|---|
| 2005/0229070 A1* | 10/2005 | Okamoto | G11B 20/18 714/746 |
| 2006/0262065 A1* | 11/2006 | Luo | G09G 3/2096 345/98 |
| 2008/0166977 A1* | 7/2008 | Khayrallah | H04L 1/0001 455/69 |
| 2012/0192039 A1* | 7/2012 | Hannuksela | H04L 1/0009 714/776 |
| 2015/0280746 A1* | 10/2015 | Sikkink | H03M 13/17 714/762 |

* cited by examiner

COMMON-MODE SIGNALING FOR TRANSITION ENCODING

CROSS-REFERENCE TO RELATED APPLICATION(S)

The present application claims priority to and the benefit of U.S. Provisional Application No. 62/058,621, filed Oct. 1, 2014, entitled "COMMON-MODE SIGNALING FOR TRANSITION ENCODING", the entire content of which is incorporated herein by reference.

FIELD

One or more aspects of embodiments according to the present invention relate to high-speed serial links, and more particularly to a system and method for mitigating burst errors in such links.

BACKGROUND

In high-speed serial links, decision feedback equalization (DFE) may be used to compensate for inter-symbol interference that may result from transmitting serial data through a channel with a non-ideal (e.g., frequency-dependent) frequency response. DFE may, however, be prone to burst errors: because DFE uses previously detected bits to cancel inter-symbol interference, if previously detected bits are in error, "interference subtraction" becomes "interference addition". To mitigate burst errors, a system may rely on interleaving, which may spread the burst of errors (i.e., a series of consecutive erroneous bits) to singular errors (errors in individual bits adjacent to correct bits), which can be corrected using error correcting codes. The size of the interleaver, i.e., the interleaver block length, may be larger than the length of burst times the block size of the error correcting code; an interleaver of this size may require significant amounts of memory to be able to accommodate burst errors of medium length, resulting in high cost. Thus, there is a need for a system for burst-error correction capable of operating without employing a large interleaver.

SUMMARY

According to an embodiment of the present invention there is provided a method for transmitting an input stream of data across a serial link including a serial channel, the method including: segmenting the stream of data into blocks of bits to form a plurality of input blocks; for an input block of the plurality of input blocks: calculating a measure of burst error probability; forming an output block and a modification signaling bit from the input block; transmitting the output block; and transmitting the modification signaling bit the forming of the output block and the modification signaling bit from the input block including: when the measure of burst error probability exceeds a set threshold: modifying the input block to form the output block; and asserting the modification signaling bit.

In one embodiment, the calculating of a measure of burst error probability includes counting consecutive transitions in the input block.

In one embodiment, the threshold is equal to m/2−1 wherein m is the length of the input block.

In one embodiment, the method includes transmitting the output block on the serial channel and transmitting the modification signaling bit on the serial channel.

In one embodiment, the transmitting of the output block on the serial channel includes transmitting the output block on the serial channel utilizing differential signaling.

In one embodiment, the transmitting of the modification signaling bit on the serial channel includes transmitting the modification signaling bit on the serial channel utilizing common-mode signaling.

In one embodiment, the method includes: receiving a block; receiving a modification signaling bit; and applying an inverse modification to the block when the modification signaling bit is asserted.

In one embodiment, the receiving of the modification signaling bit includes: obtaining a plurality of samples of the modification signaling bit; and performing majority detection on the samples.

In one embodiment, the calculating of a measure of burst error probability includes counting consecutive transitions in the input block.

In one embodiment, the threshold is equal to m/2−1 wherein m is the length of the input block.

In one embodiment, the method includes transmitting the output block on the serial channel and transmitting the modification signaling bit on the serial channel.

In one embodiment, the transmitting of the output block on the serial channel includes transmitting the output block on the serial channel utilizing differential signaling.

In one embodiment, the transmitting of the modification signaling bit on the serial channel includes transmitting the modification signaling bit on the serial channel utilizing common-mode signaling.

According to an embodiment of the present invention there is provided a system for transmitting an input stream of data across a serial link including a serial channel, the system including a transmitter configured to receive the input stream of data, the transmitter being configured to partition the stream of data into a plurality of input blocks, the transmitter including a burst error detector configured to: calculate a measure of burst error probability; and identify input blocks of the plurality of input blocks having a measure of burst error probability exceeding a threshold.

In one embodiment, the burst error detector is configured to identify input blocks of the plurality of input blocks having a measure of burst error probability exceeding a threshold by counting consecutive transitions in the input blocks of the plurality of input blocks.

In one embodiment, output blocks of the plurality of output blocks corresponding to the identified input blocks are formed by modifying the respective identified input blocks, and modification signaling bits of the plurality of modification signaling bits corresponding to the identified input blocks are asserted.

In one embodiment, the system includes a receiver configured: to receive: a plurality of received blocks, each corresponding to one of the plurality of transmitted output blocks and a plurality of received modification signaling bits, each corresponding to one of the plurality of transmitted modification signaling bits and to perform an inverse modification on each received block associated with a received modification signaling bit that is asserted.

In one embodiment, the burst error detector is configured to identify input blocks of the plurality of input blocks having a measure of burst error probability exceeding a threshold by counting consecutive transitions in the input blocks of the plurality of input blocks.

In one embodiment, the transmitter is configured to modify the identified input blocks by inverting every other bit of each identified input block, and the receiver is configured to perform an inverse modification by inverting every other bit of each received block of the plurality of received blocks on which an inverse modification is to be performed.

According to an embodiment of the present invention there is provided a display including: a timing controller; and a driver integrated circuit; the timing controller and the driver integrated circuit being connected by a serial link including a transmitter in the timing controller and a receiver in the driver integrated circuit, the transmitter being configured to partition an input stream of data into a plurality of input blocks, the transmitter including a burst error detector configured to: calculate a measure of burst error probability; and identify input blocks of the plurality of input blocks having a measure of burst error probability exceeding a threshold.

BRIEF DESCRIPTION OF THE DRAWINGS

These and other features and advantages of the present invention will be appreciated and understood with reference to the specification, claims and appended drawings wherein:

DETAILED DESCRIPTION

The detailed description set forth below in connection with the appended drawings is intended as a description of exemplary embodiments of a system and method for common-mode signaling for transition encoding provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

According to an embodiment of the present invention there is provided a system and method for transmitting an input stream of data across a serial link. The system includes a transmitter and receiver connected by a serial transmission channel. The transmitter monitors the stream of data being transmitted over the serial transmission channel for high burst error probability and divides the transmitted stream into blocks of data ("input blocks"). Each input block is encoded to prevent and/or reduce the probability of a burst error by inverting a pre-determined sub-set of bits in that block. Each of the input blocks is associated with a common-mode "modification signaling bit", that when asserted, causes a bit-inversion of the block to be performed, and when de-asserted, the block is left unchanged. The modification signaling bit is sent through common-mode signaling, in-sync with the differential block. A receiver decodes the received differential data using information received from the common-mode signal.

Figure 1:
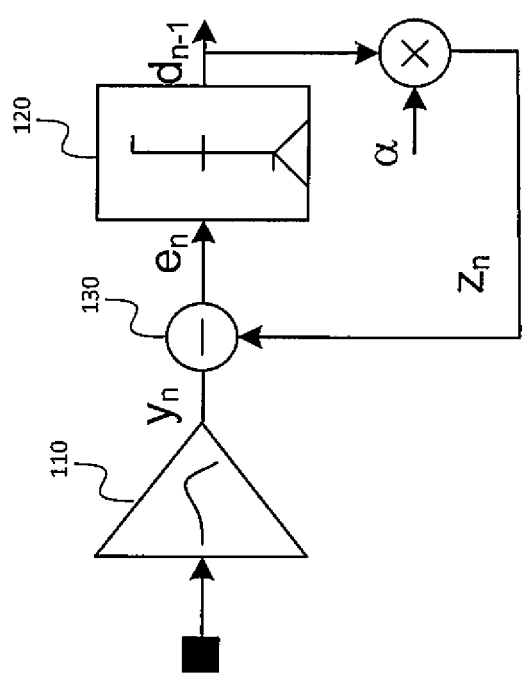
FIG. 1 is a block diagram of a receiver, according to an embodiment of the present invention.

Referring to FIG. 1, in one embodiment, a receiving circuit at the receiving end of a serial link has a continuous time linear equalizer (CTLE) 110 connected to an output end of a serial transmission channel. The serial transmission channel may be a balanced transmission line including, for example, a balanced pair of microstrip lines or a balanced stripline transmission line. As used herein, a serial "channel" refers to one or more conductors for conducting a data signal from a serial transmitter to a serial receiver, and a "serial link" consists of a serial transmitter, a serial channel, and a serial receiver, connected so that data may be transmitted from the transmitter to the receiver.

The receiving circuit may include a 1-tap DFE if the channel, is a $1+az^{-1}$ channel, i.e., channel having a frequency response approximately equal to $1+az^{-1}$. In such a system, the output of the CTLE may have an offset, due to inter-symbol interference, of +a when the previously received bit was +1 and an offset of −a when the previously received bit was −1. The DFE circuit stores the previously received bit at the output of a clocked comparator or "slicer" 120, and the product of (i) the output of the slicer and (ii) the DFE coefficient α or "a", is subtracted from the output of the CTLE, in the differencing circuit 130, to substantially cancel the offset due to inter-symbol interference. The product of the previously detected bit and the DFE coefficient α or "a", which is an estimate of the offset, due to inter-symbol interference, at the output of the CTLE, may be referred to as the "constructed interference" for the current bit.

For example, if the transmit sequence consists of alternating values, e.g., if the sequence is +1 −1 +1 −1 +1 −1 . . . , an error in one bit may cause the value subtracted from output of the CTLE by the DFE circuit for the subsequent bit to have the wrong sign. Thus instead of substantially cancelling the offset due to inter-symbol interference, the DFE may substantially double this offset. An error of infinite length may then occur if a>0.5, with each incorrect bit causing the subsequent bit to be detected incorrectly.

Referring to Table 1 below, in this example, a bit transmitted at T=0 is +1 but is incorrectly detected, e.g., due to noise, as −1 (as shown in the row labeled "Detected bit $(d_{n-1})$", in the column labeled "1"). The correction term fed back to the input of the slicer, when determining the value of the bit received for T=1, is therefore −a instead of +a. The resulting total input at the slicer is therefore −1+2a, instead of −1+a−a=−1, which would have been the input had the $0^{th}$ bit been correctly detected as +1. If a>0.5, the input at the slicer is greater than 0, and (neglecting the effects of noise and of imperfections in the receiver) the current bit is incorrectly detected as +1. This error propagates potentially indefinitely, as shown in Table 1, with the error in each bit causing an error in the subsequent bit.

TABLE 1

|  | Time (n) | | | | |
| --- | --- | --- | --- | --- | --- |
|  | 0 | 1 | 2 | 3 | 4 |
| Transmitted bit ($b_n$) | +1 | −1 | +1 | −1 | +1 |
| Received signal ($y_n$) | +1 − a | −1 + a | +1 − a | −1 + a | +1 − a |
| Detected bit ($d_{n-1}$) |  | −1 | +1 | −1 | +1 |
| Constructed interference ($z_n$) |  | −a | +a | −a | +a |
| Slicer input ($e_n$) |  | −1 + 2a | +1 − 2a | −1 + 2a | +1 − 2a |

Such indefinitely propagating burst errors may be avoided by detecting, in the transmitter, bit sequences vulnerable to long burst errors, and modifying such bit sequences before transmitting them. A modification signaling bit or "parity" bit may be transmitted along with any modified bit sequence to instruct the receiver to reverse the modification (e.g., by performing an "inverse modification"), so as to form the original bit sequence. For example, the transmitter may check for long bit sequences of alternating sign (i.e., +1 alternating with −1), and may reduce the likelihood of long burst errors by inverting every other bit, when such a sequence is detected.

Figure 2:
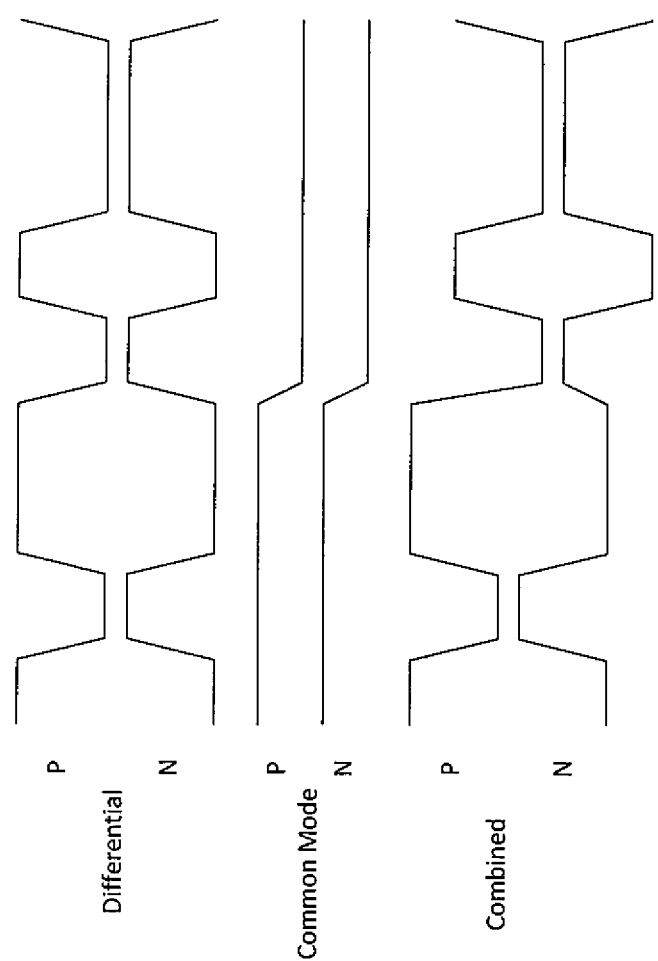
FIG. 2 is a waveform diagram of differential waveforms, common mode waveforms, and their superposition, according to an embodiment of the present invention.

The transmission of the modification signaling bit may be accomplished using common mode signaling. Referring to FIG. 2, in a differential serial link, two conductors may carry opposite signals, in a pair of waveforms forming a differential signal as shown. To the signals (i.e., voltages and/or currents) on these conductors, a common-mode component (common to both conductors) may be added, forming the combined signal shown. The combined signal carries the information of the differential signal as well as the information of the common-mode signal.

A suitably designed receiver may be used to separate the differential signal and the common-mode signal in a combined signal such as the one illustrated in FIG. 2. For example, a differential receiver may be insensitive by design (to first order) to any common-mode signals (e.g., common mode noise, or an intentionally added common mode signal) present on the differential pair of conductors forming a balanced, or "differential" transmission line.

Figure 3B:
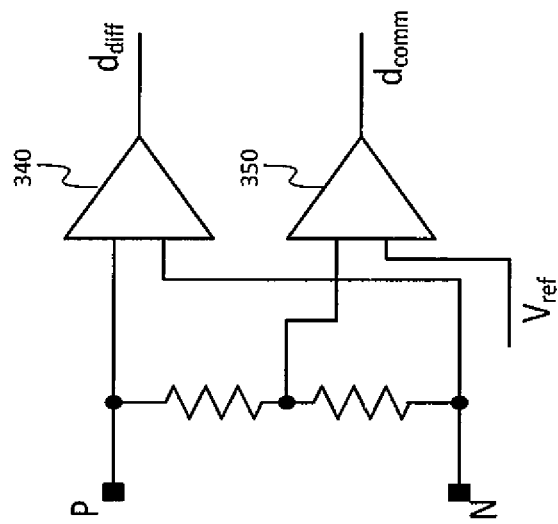
FIG. 3B is a schematic diagram of a circuit for receiving a superposition of differential waveforms and common mode waveforms, according to an embodiment of the present invention.
Figure 3A:
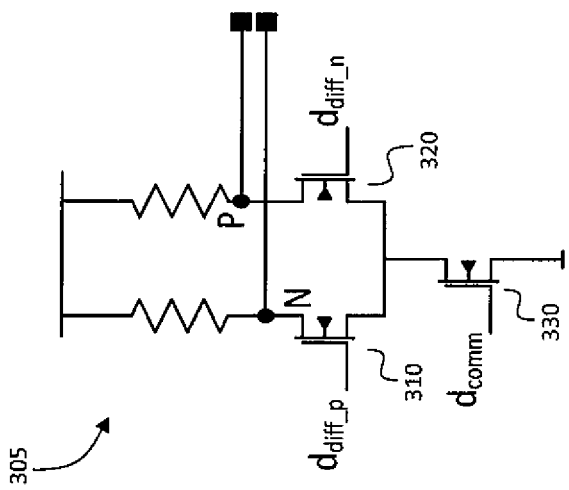
FIG. 3A is a schematic diagram of a circuit for transmitting a superposition of differential waveforms and common mode waveforms, according to an embodiment of the present invention.

FIG. 3A shows an output circuit 305 for a transmitter for transmitting a combination of common-mode and differential signals. A differential pair including a first transistor 310 and a second transistor 320 produces the differential component of the output signal in response to the differential data signal (composed of $d_{diff\_p}$ and $d_{diff\_n}$), and a third transistor 330 is used to add a common mode shift to the output, in response to the common mode signal $d_{comm}$. As a result, the common mode signal is superimposed on the differential signal at the output of the output circuit 305.

Referring to FIG. 3B, in one embodiment a differential signal transmitted on two conductors "P" and "N" is received and amplified by a first differential amplifier 340 (the output of which is insensitive to common mode signals) to produce a differential output $d_{diff}$, and a second differential amplifier amplifies the difference between (i) the average signal on the two conductors and (ii) a reference signal (e.g., Vref, as shown) to produce a common mode output $d_{comm}$. Common-mode and differential signals are orthogonal to each other, and in the circuit of FIG. 3B, common mode signals propagating on the two conductors "P" and "N" do not affect the differential output $d_{diff}$. As such, common-mode signaling may be added to a serial link using differential signaling without interfering with the differential signaling.

Figure 4A:
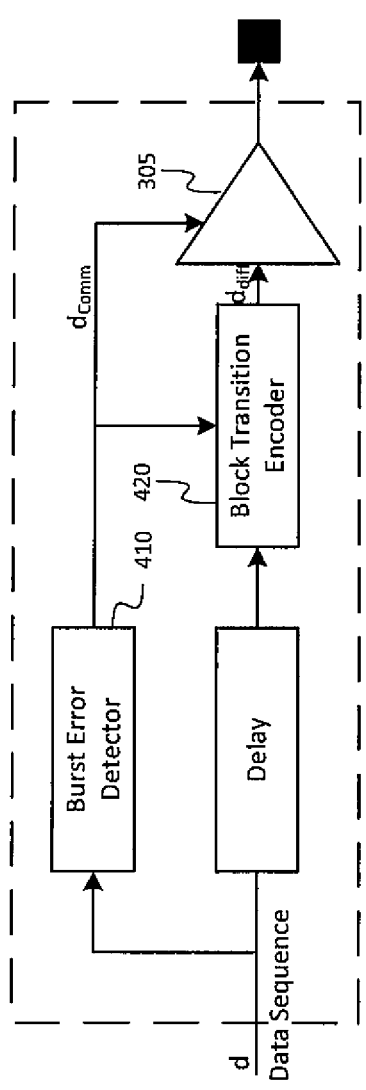
FIG. 4A is a block diagram of transmitter circuit for mitigating burst errors, according to an embodiment of the present invention.

Referring to FIG. 4A, in one embodiment, burst mode errors are mitigated by the action of a transmitter constructed as shown. The input data stream is partitioned into blocks (or "input blocks") of length "m" (e.g., blocks of 8 bits being blocks of length 8), and a burst error detector 410 in the transmitter calculates a measure of burst error probability for each block. For example if a block contains a long sequence in which +1 and −1 alternate, the burst error detector may calculate a relatively large value for the measure of burst error probability. When the calculated measure of burst error probability for a block exceeds a threshold, the burst error detector 410 asserts the modification signaling bit (labeled "$d_{comm}$" in FIG. 4A), and, in response, a block transition encoder 420 (which receives the modification signaling bit from the burst error detector 410) modifies or "encodes" the block to form an output block with a reduced probability of a burst error. When the calculated measure of burst error probability for a block is below the threshold the output block is unmodified, i.e., it is equal to the input block. For each block, the modification signaling bit (either asserted or de-asserted) and the output block (either modified or unmodified, accordingly) are then combined (in common-mode and differential signaling, respectively) in the output circuit 305 and sent across the channel to the receiver.

In particular, the modification signaling bit may be transmitted by the transmitter to the receiver through common-mode signaling, synchronized with the transmission of the data sequence, which is transmitted as a block using differential signaling. The modification signaling bit is a lower data rate signal that changes at most once per block. In one embodiment, the common mode signal is sampled, in the receiver, at the full data rate (i.e., the same rate as that at which the differential signal is sampled), e.g., by a slicer connected to the output of the second differential amplifier 350, and the m samples obtained for each block are combined (for improved reliability) in a majority detection circuit in the receiver to form the received modification signaling bit, based on which the receiver determines whether to apply an inverse modification to the received data. The majority detection circuit may include, for example, a shift register to parallelize the samples, and an adder to count the number of ones in the parallelized samples.

In one embodiment, if an alternating transmit sequence (one in which +1 alternates with −1) carries a high risk of burst errors (as in the example of Table 1), the transmitter may check each block for such a sequence, and if the block contains one, the transmitter may invert every other bit in the block, modifying the alternating sequence to become a sequence of consecutive identical bits, which may be less vulnerable to burst errors. The transmitter may also set the modification signaling bit, causing the receiver apply an inverse modification to the received data, i.e., to invert every other bit in the block after receipt, to restore the original data sequence. When the transmitter does not modify a given block, it may de-assert the modification signaling bit, thereby causing the transmitter not to apply an inverse modification to the received data.

Figure 4B:
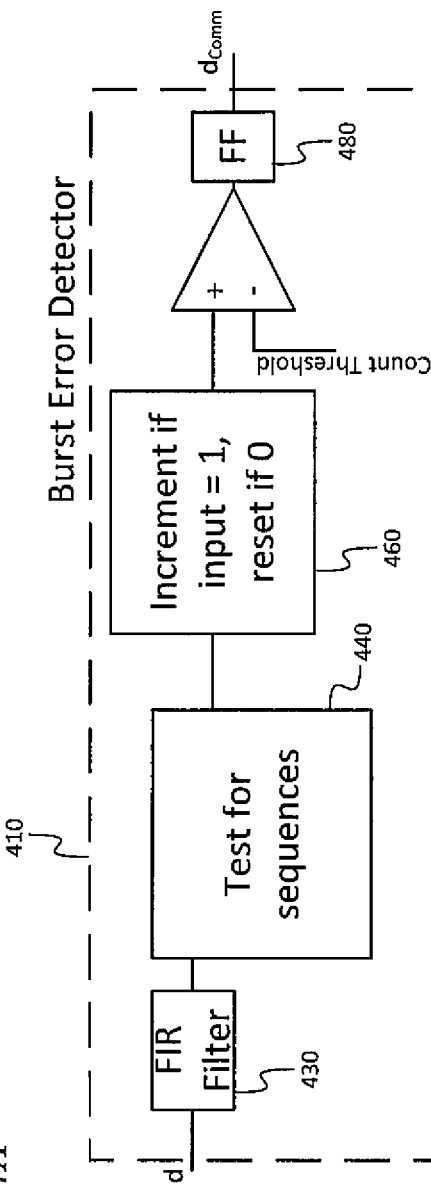
FIG. 4B is a block diagram of a burst error detector, according to an embodiment of the present invention.

Referring to FIG. 4B, in one embodiment the burst error detector includes a finite impulse response (FIR) filter 430 and a test block 440 for testing for the presence of particular bit sequences as part of a process for assessing the probability of a burst error in a block. The set of possible inputs to the FIR filter 430 is known (they are sequences of the non return to zero (NRZ) symbols of +1 and −1), and the FIR filter taps are also known because they are set at design time, or at run time by a suitable controller, so the output of the FIR filter 430 belongs to a known discrete set of values. A subset of this discrete set of outputs may therefore be identified as being prone to error propagation, and trigger incrementing of a counter 460. When the count exceeds a count threshold, a flip-flop (FF) 480 is set, to cause $d_{comm}$ (the modification signaling bit) to be asserted for the duration of the block in which the calculated measure of burst error probability (for the unmodified bit sequence) is high.

For example, if the channel has a frequency response given approximately by is $1+az^{-1}$, where a is a positive number that is less than one, then worst case ISI may occur if $b_n=1$ and $b_{n-1}=-1$, or when $b_n=-1$ and $b_{n-1}=+1$. In this case, for example, the FIR filter coefficients may be [1 −1]. When the input pattern passes through this FIR filter 430, the possible output values from the FIR filter 430 are (2, 0, −2). Output of zero represents an alternating input sequence. Outputs of 2 and −2 represent non-alternating input sequences. The test block 440 may therefore be configured to output a 1 when the output of the FIR filter 430 is 0, and to output a 0 when the output of the FIR filter 430 is 2 or −2, to cause the counter 460 to be incremented when an alternating input sequence is being transmitted.

In another example, if the channel is $1+az^{-1}+bz^{-2}+cz^{-3}$ (where the symbol b without a subscript refers to a channel coefficient, and (unlike the symbol b with a subscript) not to a transmitted bit). The possible values at the output of the channel are $\pm 1 \pm a \pm b \pm c$. If a, b, and c are all positive, the minimum channel output may be $1-a-b-c$ and $-1+a+b+c$ (in an absolute sense). The FIR filter coefficients may be chosen to be [1 −0.5 −0.25 −0.125] to detect these particular patterns, and the subset of FIR output values that triggers incrementing of the counter 460 may be $\pm(1-0.5-0.25-0.125)$.

As in the example above, FIR filter coefficients that are the inverse of different powers of two may guarantee unique outputs from the FIR filter 430 for all possible input sequences. In one embodiment the FIR filter 430 may have the same length m as the input block, and may have coefficients that are the inverse of different powers of two, and the counter 460 may be omitted. In this embodiment the output of the test block 440 may trigger encoding of the input block whenever the output of the FIR filter 430 corresponds to one of the bit patterns having a relatively high burst error probability (e.g., bit patterns having more than a threshold number of consecutive transitions, as described in further detail below).

Figure 5:
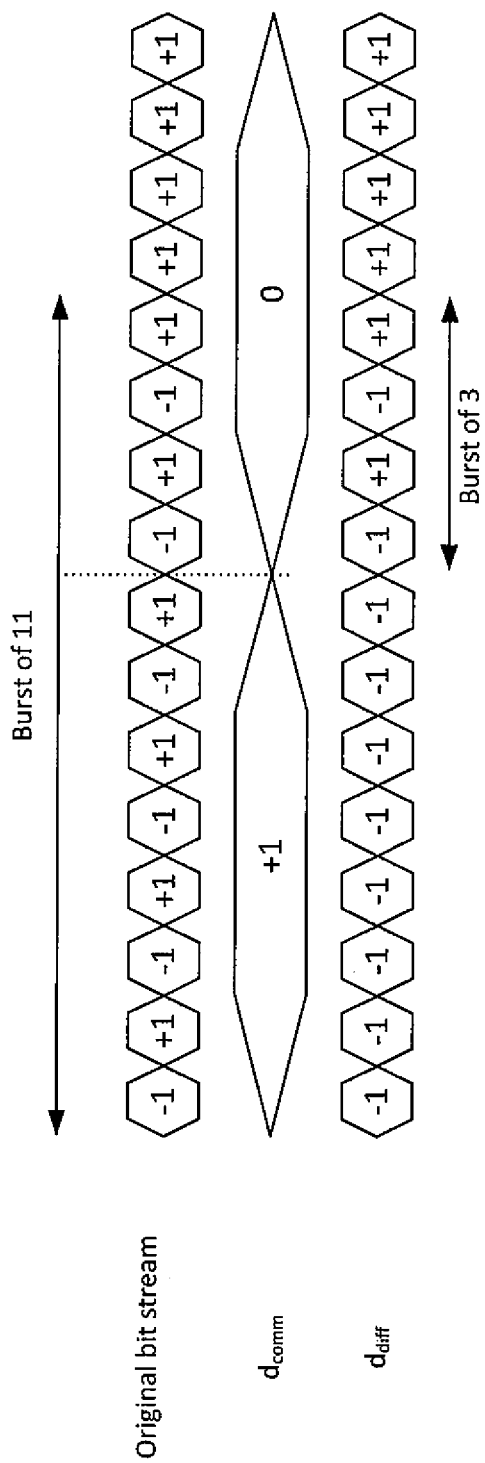
FIG. 5 is a timing diagram showing original and modified bit streams, according to an embodiment of the present invention.

Referring to FIG. 5, in a system with a block length of m=8, using a common-mode signaling rate of ⅛ of the differential rate, if alternating sequences result in high burst error probabilities, then the calculation of a measure of burst error probability may reduce to counting consecutive transitions. The transmitter may invert every even-indexed bit (i.e., bits 0, 2, 4, and 6) within a block if the number of transitions in that block is greater than 3 (i.e., m/2−1, where m is the block length). A burst of 11 transitions as illustrated in FIG. 5, of which seven occur in a first block and four in the following block, may then result in the first block being modified. In particular, every other bit of the first block may be inverted, and the first block may become a sequence of 8 identical bits. As a result the burst of 11 transitions is replaced with a burst of three transitions.

Figure 6:
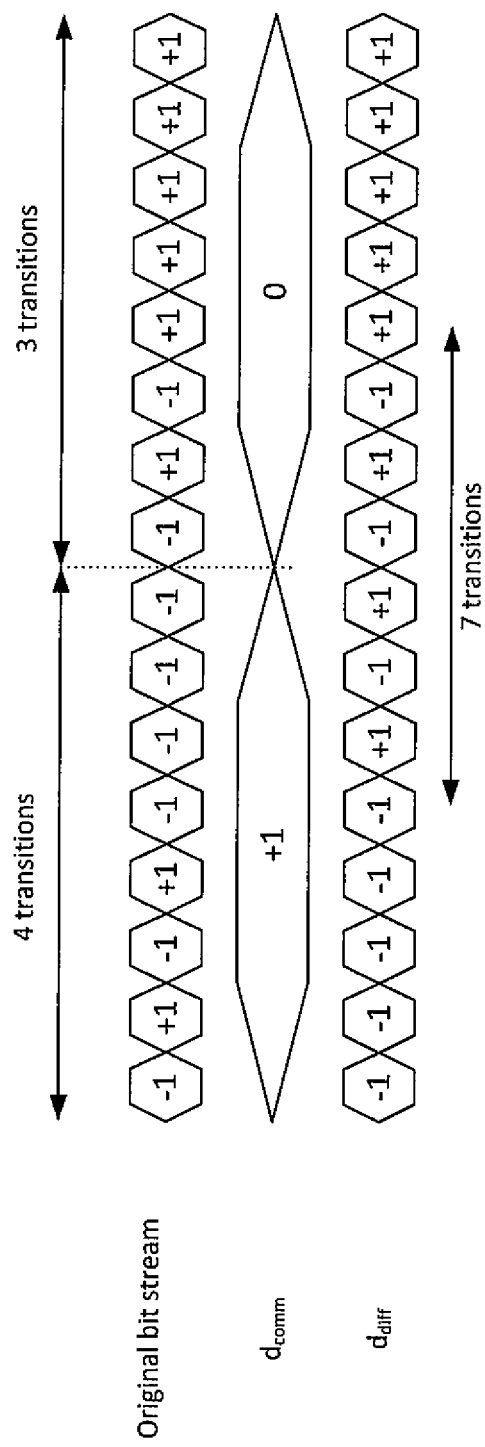
FIG. 6 is a timing diagram showing original and modified bit streams, according to an embodiment of the present invention.

Referring to FIG. 6, in embodiments in which the burst detection algorithm operates only within blocks (and not at the boundary of the blocks), the worst case burst length may be 7, which may result when a first block has four consecutive transitions and the next block has three. The first block is modified, e.g., every other bit is inverted, which eliminates the originally present transitions but introduces a new set of three transitions at the end of the block. Together with a transition between the blocks, and three transitions at the beginning of the following block, this results in 7 consecutive transitions in the data stream at the output of the transmitter. A relatively small interleaver may suffice to spread the burst of errors (e.g. 7 consecutive bit errors) that could result from this burst of transitions.

Embodiments of the present invention may also be used for channels with other frequency responses, e.g., a channel with a frequency response given approximately by $1+0.4z^{-1}-0.2z^{-2}$. Table 2 shows all possible 3-bit sequences.

TABLE 2

| $d_{n-2}$ | $d_{n-1}$ | $d_n$ | Channel output | Detected signal with perfect DFE (no error propagation) | Detected signal with perfect DFE (if $d_{n-1}$ and $d_{n-2}$ were both in error) |
|---|---|---|---|---|---|
| −1 | −1 | −1 | −1.2 | sign(−1.2 + 0.4 − 0.2) = sign(−1) | sign(−1.2 − 0.4 + 0.2) = sign(−1.4) |
| 1 | −1 | −1 | −1.6 | sign(−1.6 + 0.4 + 0.2) = sign(−1) | sign(−1.6 − 0.4 − 0.2) = sign(−2.0) |
| −1 | 1 | −1 | −0.4 | sign(−0.4 − 0.4 − 0.2) = sign(−1) | sign(−0.4 + 0.4 + 0.2) = sign(+0.2) |
| 1 | 1 | −1 | −0.8 | sign(−0.8 − 0.4 + 0.2) = sign(−1) | sign(−0.8 + 0.4 − 0.2) = sign(−0.6) |
| −1 | −1 | 1 | 0.8 | sign(+0.8 + 0.4 − 0.2) = sign(+1) | sign(+0.8 − 0.4 + 0.2) = sign(0.6) |
| 1 | −1 | 1 | 0.4 | sign(+0.4 + 0.4 + 0.2) = sign(+1) | sign(+0.4 − 0.4 − 0.2) = sign(−0.2) |
| −1 | 1 | 1 | 1.6 | sign(+1.6 − 0.4 − 0.2) = sign(+1) | sign(+1.6 + 0.4 + 0.2) = sign(2.2) |
| 1 | 1 | 1 | 1.2 | sign(+1.2 − 0.4 + 0.2) = sign(+1) | sign(+1.2 + 0.4 − 0.2) = sign(1.4) |

In this example, for both of the 3-bit sequences with two transitions (−1, +1, −1 and +1, −1, +1), the third bit is incorrectly detected if the two preceding bits are incorrect. This burst error may propagate indefinitely. For example, as a result of the third bit being incorrect, the fourth bit being preceded by two incorrect bits and may also be incorrectly detected. As in the example above of a channel with a frequency response given by $1+az^{-1}$ (with a>0.5), the burst error detector 410 in this example may test the current block for any alternating sequence having a length greater than m/2.

Figure 7:
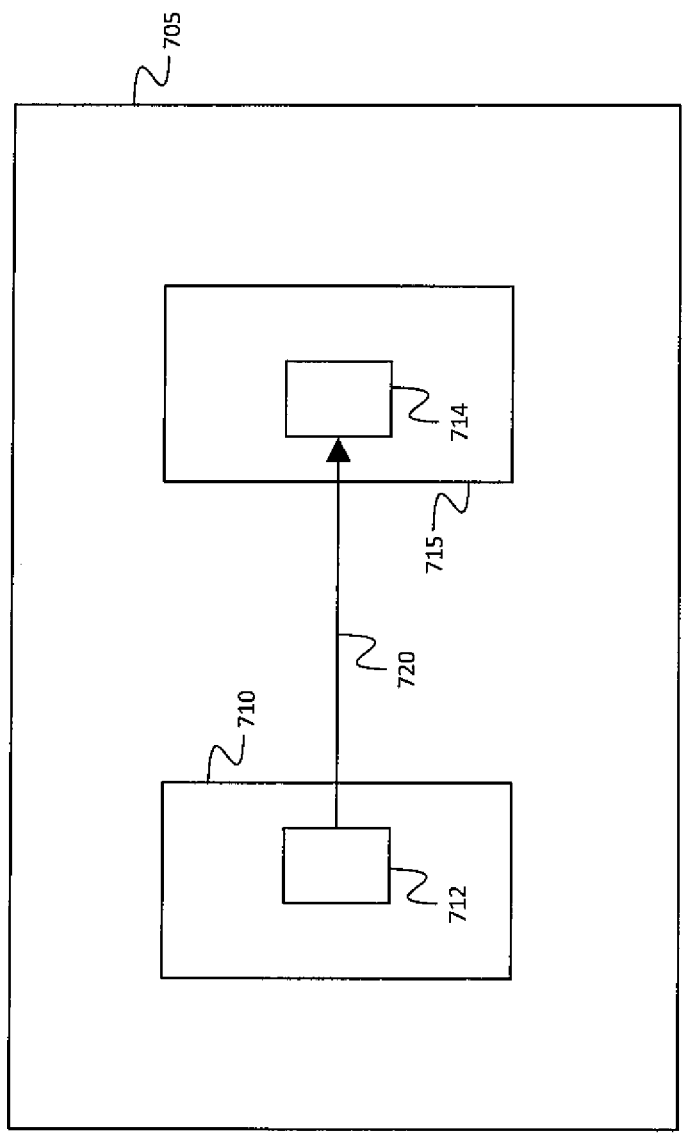
FIG. 7 is a block diagram of a display, according to an embodiment of the present invention.

Referring to FIG. 7, in one embodiment, a display 705 contains a timing controller 710 including a serial transmitter 712 configured to send high-speed digital data to a serial receiver 714 in a driver integrated circuit (driver IC) 715, over a non-ideal (e.g., lossy) channel 720. The receiver 714 receives a signal that is affected by inter-symbol interference. The transmitter 712 and the receiver 714 include a system for common-mode signaling for transition encoding constructed according to an embodiment of the present invention to mitigate the effects of the inter-symbol interference. Here, in embodiments of the present invention, the display is an organic light emitting diode (OLED) display or a liquid crystal display (LCD).

Figure 8:
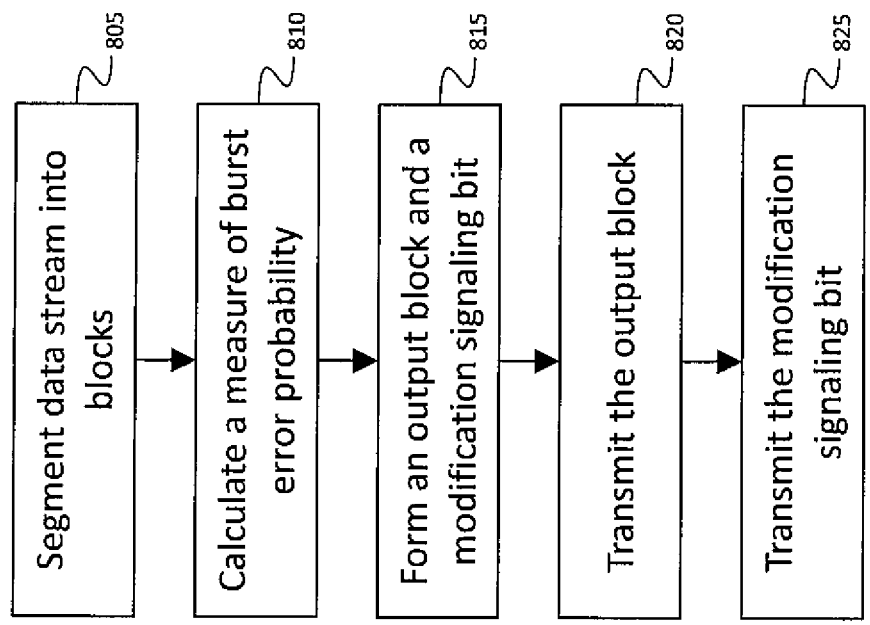
FIG. 8 is a flow chart of a method of common-mode signaling for transition encoding, according to an embodiment of the present invention.

Referring to FIG. 8, in one embodiment a sequence of acts is performed by the transmitter. In an act 805 the stream of data is segmented into blocks of bits to form a plurality of input blocks, in an act 810 a measure of burst error probability is calculated, in an act 815 an output block and a modification signaling bit are formed from the input block, in an act 820 the output block is transmitted, and in an act 825 the modification signaling bit is transmitted (e.g., using common-mode signaling).

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system and method for common-mode signaling for transition encoding have been specifically described and illustrated herein, many modifications and variations will be apparent to those skilled in the art. Accordingly, it is to be understood that a system and method for common-mode signaling for transition encoding constructed according to principles of this invention may be embodied other than as specifically described herein. The invention is also defined in the following claims, and equivalents thereof.

What is claimed is:

1. A method for transmitting an input stream of data across a serial link comprising a transmitter and a serial channel, the method comprising:
   segmenting the stream of data into blocks of bits to form a plurality of input blocks;
   for an input block of the plurality of input blocks:
      calculating, by the transmitter, a measure of burst error probability;
      forming an output block and a modification signaling bit from the input block;
      transmitting the output block; and
      transmitting the modification signaling bit,
      the forming of the output block and the modification signaling bit from the input block comprising:
         when the measure of burst error probability exceeds a set threshold:
            modifying the input block to form the output block; and
            asserting the modification signaling bit, and
         when the measure of burst error probability does not exceed the set threshold:
            forming the output block to be equal to the input block; and
            de-asserting the modification signaling bit,
   wherein the calculating of a measure of burst error probability comprises counting consecutive transitions in the input block.

2. The method of claim 1, wherein the threshold is equal to m/2−1 wherein m is the length of the input block.

3. The method of claim 1, further comprising transmitting the output block on the serial channel and transmitting the modification signaling bit on the serial channel.

4. The method of claim 3, wherein the transmitting of the output block on the serial channel comprises transmitting the output block on the serial channel utilizing differential signaling.

5. The method of claim 3, wherein the transmitting of the modification signaling bit on the serial channel comprises transmitting the modification signaling bit on the serial channel utilizing common-mode signaling.

6. The method claim 1, further comprising:
receiving a block;
receiving a modification signaling bit; and
applying an inverse modification to the block when the modification signaling bit is asserted.

7. The method of claim 6, further comprising transmitting the output block on the serial channel and transmitting the modification signaling bit on the serial channel.

8. The method of claim 7, wherein the transmitting of the output block on the serial channel comprises transmitting the output block on the serial channel utilizing differential signaling.

9. The method of claim 7, wherein the transmitting of the modification signaling bit on the serial channel comprises transmitting the modification signaling bit on the serial channel utilizing common-mode signaling.

10. The method of claim 1, wherein the threshold is equal to m/2−1 wherein m is the length of the input block.

11. A method for transmitting an input stream of data across a serial link comprising a transmitter and a serial channel, the method comprising:
segmenting the stream of data into blocks of bits to form a plurality of input blocks;
for an input block of the plurality of input blocks:
calculating, by the transmitter, a measure of burst error probability;
forming an output block and a modification signaling bit from the input block;
transmitting the output block; and
transmitting the modification signaling bit,
the forming of the output block and the modification signaling bit from the input block comprising:
when the measure of burst error probability exceeds a set threshold:
modifying the input block to form the output block; and
asserting the modification signaling bit, and
when the measure of burst error probability does not exceed the set threshold:
forming the output block to be equal to the input block; and
de-asserting the modification signaling bit,
the method further comprising:
receiving a block;
receiving a modification signaling bit; and
applying an inverse modification to the block when the modification signaling bit is asserted,
wherein the receiving of the modification signaling bit comprises:
obtaining a plurality of samples of the modification signaling bit; and
performing majority detection on the samples.

12. The method of claim 11, wherein the calculating of a measure of burst error probability comprises counting consecutive transitions in the input block.

13. The method of claim 12, wherein the threshold is equal to m/2−1 wherein m is the length of the input block.

14. The method of claim 11, further comprising transmitting the output block on the serial channel and transmitting the modification signaling bit on the serial channel.

15. A system for transmitting an input stream of data across a serial link comprising a serial channel, the system comprising a transmitter configured to receive the input stream of data, the transmitter being configured to partition the stream of data into a plurality of input blocks, the transmitter comprising a burst error detector configured to:
calculate a measure of burst error probability; and
identify input blocks of the plurality of input blocks having a measure of burst error probability exceeding a threshold,
wherein the burst error detector is configured to identify input blocks of the plurality of input blocks having a measure of burst error probability exceeding a threshold by counting consecutive transitions in the input blocks of the plurality of input blocks.

16. The system of claim 15, wherein the transmitter is further configured to:
transmit a plurality of output blocks and a plurality of modification signaling bits, wherein:
output blocks of the plurality of output blocks corresponding to the identified input blocks are formed by modifying the respective identified input blocks, and
modification signaling bits of the plurality of modification signaling bits corresponding to the identified input blocks are asserted.

17. The system of claim 16, further comprising a receiver configured:
to receive:
a plurality of received blocks, each corresponding to one of the plurality of transmitted output blocks and
a plurality of received modification signaling bits, each corresponding to one of the plurality of transmitted modification signaling bits and
to perform an inverse modification on each received block associated with a received modification signaling bit that is asserted.

18. The system of claim 17, wherein the burst error detector is configured to identify input blocks of the plurality of input blocks having a measure of burst error probability exceeding a threshold by counting consecutive transitions in the input blocks of the plurality of input blocks.

19. The system of claim 18, wherein the transmitter is configured to modify the identified input blocks by inverting every other bit of each identified input block, and the receiver is configured to perform an inverse modification by inverting every other bit of each received block of the plurality of received blocks on which an inverse modification is to be performed.

* * * * *